Sept. 19, 1939.  W. T. DUNN ET AL  2,173,648
POWER TRANSMISSION
Filed Nov. 27, 1936   5 Sheets-Sheet 3

INVENTORS.
Teno Iavelli,
William T. Dunn.
BY Harness, Dickey & Pierce Harris
ATTORNEYS.

Patented Sept. 19, 1939

2,173,648

UNITED STATES PATENT OFFICE 2,173,648

POWER TRANSMISSION

William T. Dunn and Teno Iavelli, Detroit, Mich., assignors to Chrysler Corporation, Highland Park, Mich., a corporation of Delaware Application November 27, 1936, Serial No. 112,903

35 Claims. (Cl. 74—262)

This invention relates to power transmission mechanism and refers more particularly to improvements in power transmission systems especially adapted for use in connection with motor vehicles, although not necessarily limited thereto.

Our invention, in certain more limited aspects, provides improvements in the drive and control for power transmission systems having epicyclic or planetary gear trains adapted to provide the desired speed ratio between the vehicle engine and driving ground wheels.

One object of our invention resides in the provision of an improved selector and actuating mechanism for obtaining the several speed ratios provided by the speed changing mechanism, the latter being preferably of the planetary gear type although not necessarily limited thereto in the broader aspects of our invention.

A further object of our invention resides in the provision of improved controls and actuating mechanism for selecting and manipulating the various gear trains of a transmission, particularly a planetary type of transmission, whereby means is provided responsive in an improved manner to manual control for automatically and quickly bringing about a complete cycle of gear ratio change.

In carrying out the above objects of our invention, we preferably provide a common actuator or prime mover preferably of the fluid pressure type for applying the necessary force to the braking devices of the planetary trains in order to control the rotation of the desired customary control drums.

Our selector mechanism is under manual control by the vehicle driver for causing the common actuator to quickly and efficiently apply a braking force to the proper drum. This actuator, when of the fluid pressure type, is operated by oil pressure, air pressure either above or below atmospheric pressure, or other equivalent systems. We prefer, according to the teachings of this phase of our invention, to provide for energizing the actuator by oil pressure.

A further object of our invention resides in the provision of an improved selector control mechanism for use with change speed mechanisms of the character aforesaid. We have provided a manually operable selector element for controlling all speed changes, including a neutral setting and reverse, our improved mechanism providing for rapid speed ratio changes in automatic response to manipulation of the selector element between any of its positions of control.

An additional object of our invention is to provide an improved transmission system adapted for manual control with a minimum of effort and a maximum of safety to the operating parts, our system of controls being arranged for manipulation with a minimum of effort and attention on the part of the vehicle driver, thereby increasing the safety of vehicle driving and the comfort of the driver.

In carrying out the above objects of our invention we have provided an electrical control for a fluid pressure supply valve, the arrangement insuring release of a driving speed ratio immediately on manual adjustment of the selector element to a new setting. Our mechanism is so constructed and arranged that the fluid pressure operator, acting to provide a selected condition of drive, is immediately released at the start of an adjusting movement of the manual selector element thereby enabling us to utilize the balance of the adjusting movement of the manual selector element to effect selection of a new set of speed ratio gears or a new condition in the transmission, preferably through the intermediary of a common selector operating element. Such arrangement, among other things, reduces the time required to produce changes in the transmission settings, prevents danger of jamming the control parts, and relieves the operator of any conscious effort timing the manual movement of the selector element with other parts of the system.

More particularly, our invention provides a single manually operated shiftable control element for selecting the various drives, including reverse, through the planetary transmission. This shiftable element is so arranged that its stations of control are associated with an H-plate so that the control may be effected in similar manner to shifting movements of conventional gear shift levers of present day countershaft type transmissions or gear boxes. We have so arranged the parts that during selection of our control element, the planetary trains automatically respond to the H-movement to effect complete changes in the settings of the transmission as may be desired. We furthermore preferably arrange our mechanism so that any setting of the transmission may be effected from any other setting without manipulating any intervening drives, although in a modification of our invention we have illustrated an arrangement which momentarily manipulates the intervening drives. Thus, by way of example, in the preferred form, the operator may select reverse or low speed from a neutral setting without operating the transmission for the intervening conditions of second and third or direct speeds.

In the modified form, the shift from neutral to reverse or low may be quickly made so that the intervening manipulations will not be felt in actually driving the car; the operator may also, if desired, apply the vehicle brakes momentarily during such a shift. The use of a fluid type clutch also absorbs and dampens the tendency of the vehicle to actually drivingly respond to such intervening conditions during a single shift.

A further object of our invention is to provide an improved arrangement of motor vehicle controls providing for improved ease of driving the vehicle particularly for city driving where frequent starting and stopping is required.

A planetary type of transmission presents a number of advantages over the more conventional sliding gear types of transmissions, and our invention is therefore primarily directed toward planetary types of transmissions and power transmission systems employing planetary gear speed ratio controlling devices although, as aforesaid, the fundamental principles of our invention may, if desired, be employed in connection with transmissions of other types including the aforesaid sliding gear types of transmissions. By way of example in connection with the aforesaid advantages of the planetary transmission over more conventional types, it may be noted that the planetary transmission, especially when used in conjunction with a fluid type of clutch between the engine and transmission, permits gear changes without the necessity of releasing the heretofore conventional main clutch between the engine and transmission so as to obtain relatively quick gear changes and faster acceleration of the motor vehicle. This is made possible by reason of the fact that the braking devices associated with the planetary gear trains may quickly operate, the fluid clutch smoothing the shock of the gear change by reason of its inherent slipping qualities.

Further objects and advantages of our invention will be apparent from the following detailed description of a preferred embodiment of our invention, reference being had to the accompanying drawings in which.

Figure 1:
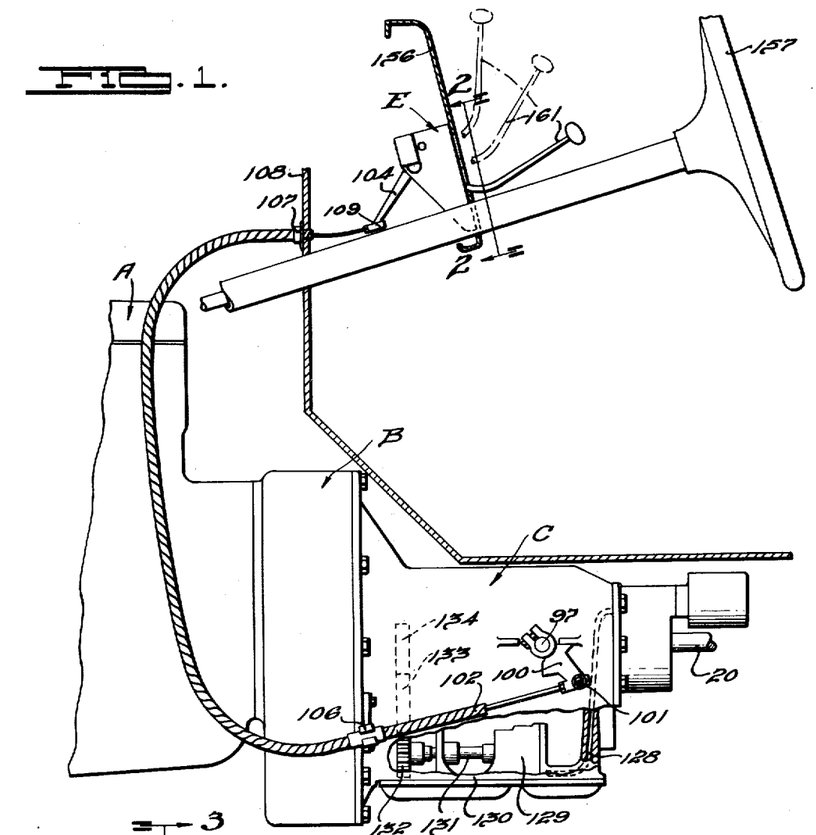
Fig. 1 is a side elevational view somewhat diagrammatic in form illustrating our power transmission mechanism as a whole, a portion of the transmission casing being broken away to illustrate the fluid pressure pump.
Figure 2:
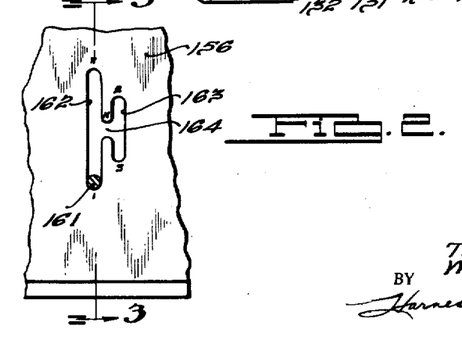
Fig. 2 is a detail sectional view showing the manually controlled selector element and H-plate therefor, the section being taken as indicated on the line 2—2 of Fig. 1.

Referring to the drawings, we have illustrated our invention in connection with a motor vehicle drive, this drive including a prime mover or engine A, a portion of which is shown in Fig. 1, a main clutch B driven from the engine, and a change speed transmission or gear box C driven from the clutch B. The drive passes from the transmission through the power take-off shaft 20, which, as usual, may extend rearwardly of the vehicle to drive the usual ground wheels (not shown).

Figures 6, 7:
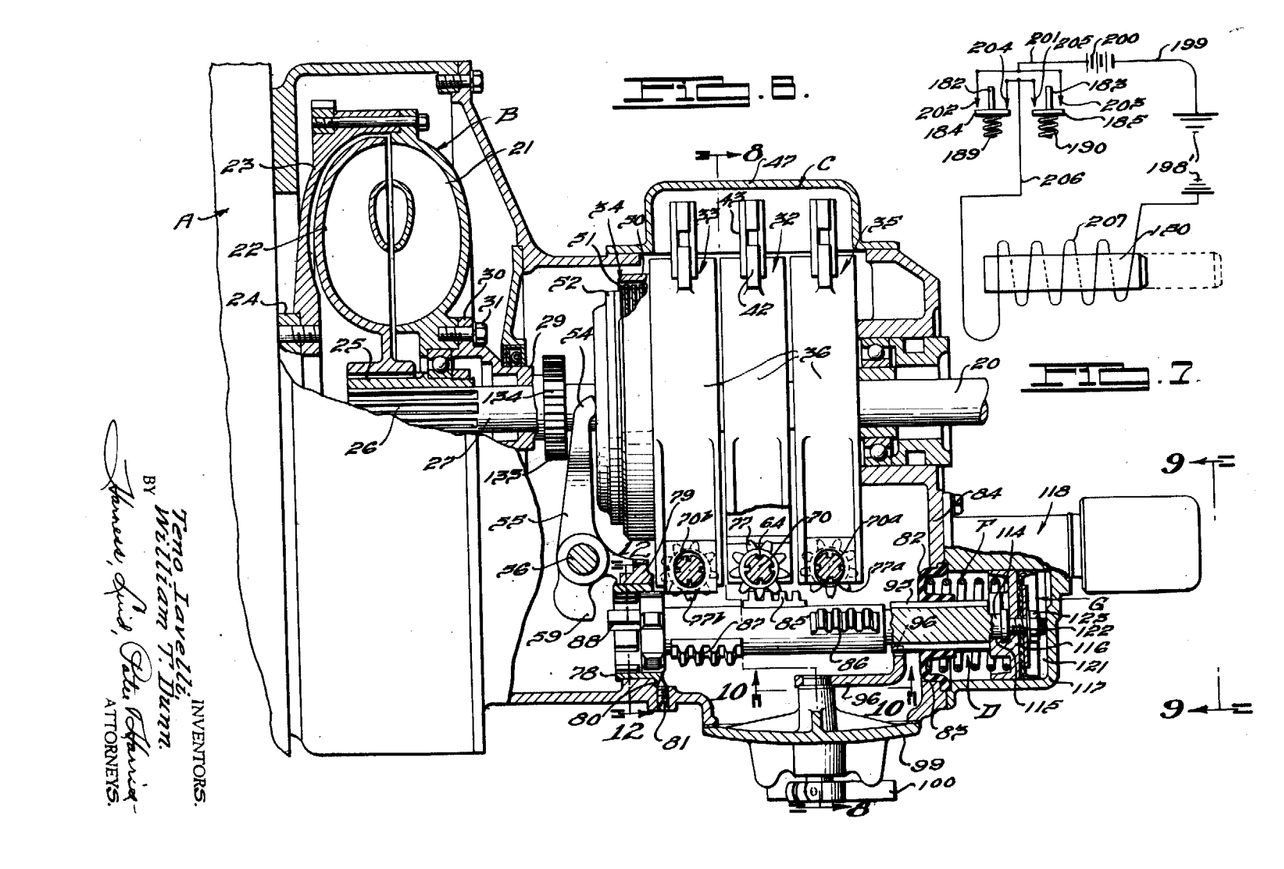
Fig. 6 is an enlarged sectional plan view through the transmission and fluid clutch.
Fig. 7 is a diagrammatic view illustrating the electrical system of control between the manually operated selector element and the fluid pressure control valve mechanism.

The clutch B may be of any suitable construction for controlling the drive between engine A and transmission C, this clutch being illustrated in Fig. 6 in the form of a fluid coupling type having the usual driving and driven cooperating vane members 21 and 22 respectively. The driving vane member 21 is carried by the engine flywheel 23, the latter being connected as usual with the rear end of the engine crankshaft 24. The driven vane member 22 is splined to a hub 25 which in turn is splined at 26 on the forward end of the driven shaft 27. This driven shaft extends rearwardly to drive the power take-off shaft 20 through the intermediary of the various gear trains of transmission C.

Where the power means for operating the transmission is afforded by a fluid such as oil under pressure, the pump for placing the oil under pressure is preferably operated from the engine to maintain the fluid pressure even when the pump is idling. It is therefore preferred to provide a pump drive from the driving clutch member 21 rather than the driven clutch member 22 inasmuch as the latter may be stationary under certain conditions of vehicle operation such as when the vehicle is standing still with the engine idling.

This pump drive may be provided by reason of a driving sleeve or hollow shaft 29 mounted on the shaft 27 but rotatable independently thereof. The sleeve 29 has a hub or flange 30 connected at 31 with the driving vane member 21 of the clutch B so that even when the driven vane member 22 is not being operated from the driving vane member 21, the sleeve 29 will be rotatably driven from the engine crankshaft 24 and flywheel 23. The pump drive from sleeve 29 will be more apparent hereinafter.

We have illustrated the fluid type of clutch B since a clutch of this character has a number of advantages in connection with a transmission of the planetary gear type C and in further connection with our arrangement of vehicle driving controls which will be presently described more in detail. Among the advantages of the fluid type of clutch are the provision of a smooth drive for the vehicle through the planetary transmission, relatively high power driving efficiency, automatic release of the drive between the engine and transmission when the engine is idling, and with the transmission manipulated to establish one of its driving gear ratio settings, and other well known favorable characteristics. We desire to point out, however, that other types of clutches may be employed to control the drive between engine A and transmission C within the broader aspects of our invention. For example, the well known type of friction clutch may be employed and manually operated or automatically operated by the well known commercial type of vacuum clutch releasing mechanism as will be readily understood.

We have illustrated the change speed transmission C as the epicyclic or planetary type, this general form of transmission being well known in the art and, as usual, includes a plurality of transmission speed ratio controlling clutches or brakes 32, 33, 34 and 35, these braking controlling devices being respectively adapted to actuate the transmission in its first speed ratio or low gear, second speed ratio or intermediate gear, third speed ratio or direct drive, and reverse drive. Other speeds may be provided as desired.

Figure 8:
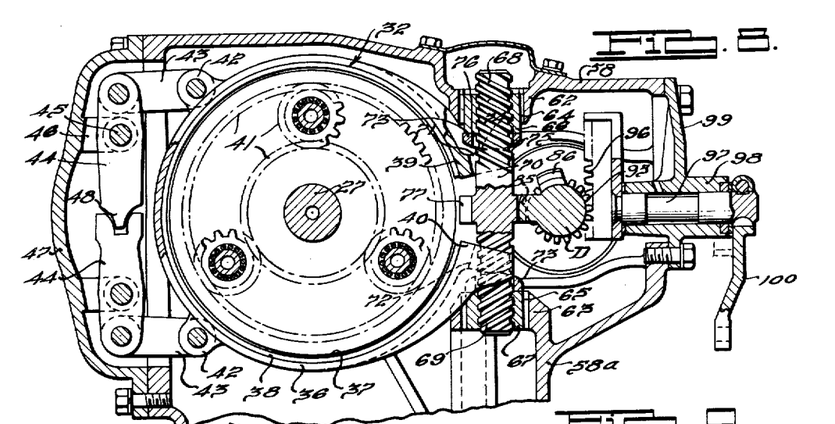
Fig. 8 is a sectional elevational view through the transmission illustrating one of the speed ratio controlling devices and parts associated therewith, the section being taken along the line 8—8 of Fig. 6.

The typical brake device 32 illustrated in Fig. 8 consists of an outer band 36 which substantially surrounds the rotary element or drum 37, the band being provided with friction braking material 38 carried by the band and adapted for frictional engagement with the drum 37. The band 36 has its ends formed with laterally projecting actuating flanges 39 and 40 positioned adjacent each other, means being provided to move the band ends toward each other to contract the band 36 for causing the friction material 38 to brake rotary drum 37, the band having sufficient inherent resilience to expand away from contact with the drum when the actuating means is relieved at the flanged ends 39 and 40. In Fig. 8 the low speed ratio braking device 32 is illustrated in its inoperative position whereby the drum 37 is free to rotate through operation of the planetary gear set 41 somewhat diagrammatically illustrated in association with the drum 37. When the braking device 32 is actuated by contracting the band 36, the drum 37 is held against rotation, the driven shaft 20 in such instance being operated through the planetary gearing 41 to provide the low speed drive for the motor vehicle.

In order to anchor the band 36 and to substantially equalize the braking forces applied to drum 37 around the periphery thereof and thereby substantially avoid a tendency toward lateral loading of the drum and planetary gearing transverse to the axis of the drum, we have provided the band with a circumferentially spaced pair of anchoring flanges 42. These flanges are connected through links 43 with the levers 44 pivotally mounted at 45 with the supporting bracket 46 of the transmission side cover casing 47, the levers 44 being interlocked at 48 so that movement of one of the flanges 42 will be transmitted through the pivotal levers 44 and the links 43 to the other portion of the band associated with the anchoring device. The links 43 are thus pivotally connected at their opposite ends respectively with the anchors 42 and levers 44.

The third speed clutching controlling device 34 is arranged for a direct drive through the transmission and differs somewhat from the braking devices 32, 33 and 35 in that the controlling device 34 has its rotary controlling element 50 adapted for clutching action in a well known manner by frictional engagement through the discs 51 by an axially movable clutching member 52. The latter clutching member is thus engaged by the yoked end 54 of an actuating lever 55 pivotally mounted by a pin 56 suitably supported in the transmission casing. On the opposite side of pivot 56 the lever 55 is provided with a step actuating portion 59, the purpose of which will presently be more apparent.

The transmission casing portions 58 and 58ª are respectively provided with the vertically spaced inwardly extending supporting brackets 62 and 63, respectively, these brackets being formed with coaxial splined openings 64 and 65, respectively. Splined within these openings are the nuts 66 and 67 which are axially and oppositely threaded to receive the correspondingly threaded ends 68 and 69 of an operating oscillatory shaft or screw 70.

The shaft 70 extends through openings 71 and 72, respectively, formed to open laterally in the aforesaid band ends 39 and 40, these openings having considerable clearance with shaft 70 so as not to bind on the shaft when the band is contracted and expanded. In order to transmit the thrust of the nuts 66 and 67 to the flanges 39 and 40 so as to relieve distorting loads on the shaft 70 and parts associated therewith, each nut cperates a sleeve 73 having a curved face 74 engaging a curved face 75 of band end 39 or 40. The engaged curved faces 74 and 75 provide a rocking freedom of action, each sleeve 73 having a clearance indicated at 76 with the shaft 70.

The operating shaft 70 of the low speed braking device 32 has its portion thereof intermediate the band ends 39 and 40 formed with a gear 77, the means for oscillating shaft 70 through the gear 77 being hereinafter more particularly described.

In the operation of the low speed controlling device 32 as thus far described, it will be apparent that when the shaft 70 is given a rotary movement, such movement operates through the oppositely threaded ends 68 and 69 of the shaft 70 to cause the nuts 66 and 67 to move inwardly toward each other in their splined openings 64 and 65 respectively, this movement acting through the sleeves 73 to contract the band ends 39 and 40 whereby the low speed drum 37 has its rotation checked for establishing the low speed drive through the transmission. When the shaft 70 is rotated in the opposite direction, the nuts 66 and 67 are moved away from each other and the band 36 is expanded to permit the drum 37 to again rotate and thereby relieve the drive through the transmission controlling device 32.

In order to avoid repetition we have not illustrated all of the details of the brake operated means associated with the controlling devices 33 and 35, it being understood that such operating means are similar to that described in connection with the controlling device 32. For convenience of reference the operating shaft or screw for the reverse speed braking device is designated as 70ª and the corresponding shaft for the second speed braking device 33 is designated as 70ᵇ. The gears associated with these screw shafts are respectively designated as 77ª and 77ᵇ. As will be more apparent presently, the gears 77, 77ª and 77ᵇ and lever end 59 are adapted to be selectively operated in order to selectively control the engagement and release of the respective speed ratio controlling devices 32, 35, 33 and 34.

We will next describe the common operating means or selector operating element which is adapted for selective engagement under manual control with the aforesaid screw gears 77, 77ᵃ and 77ᵇ for respectively operating the speed ratio controlling devices 32, 35 and 33; also for operating the direct or third speed controlling device 34; and also for establishing a neutral condition in the transmission.

The transmission casing is adapted to support a pair of axially aligned bearings for receiving the reciprocating and oscillating rack or actuating shaft D. The forward bearing is provided by a bushing 78 non-rotatably received in an opening of a casing support bracket 79, the bushing being held against axial displacement forwardly by a bushing projection 80 and rearwardly by the set screw 81. The rear bearing is provided by a member 82 which is disposed in a suitable opening 83 in the rear end wall 84 of the transmission casing, the rear end of the actuating shaft D being also supported by a piston for reciprocating the shaft and which will presently be referred to in detail.

This actuating shaft D has a series of teeth forming a rack adapted to be brought into operative association with each of the screw gears, these racks being designated at 85, 86 and 87 for respectively operating the screw gears 77, 77ᵃ and 77ᵇ. The forward end of shaft D is further provided with a third speed actuating projection 88 adapted for engagement with the lever shoulder 59 for operating the third speed controlling device 34. It will be noted that the racks and projection 88 are longitudinally spaced along the shaft D and that they are also spaced circumferentially of the shaft whereby upon progressive rotation of the shaft only one of the racks and the projection 88 will engage its associated screw gear or lever 55 at any time.

In Figs. 6 and 8 it will be noted that the shaft D is positioned so that the low speed rack 85 is in position for operating the low speed gear 77 and when the shaft D is moved forwardly or to the left as viewed in Fig. 6, the low speed screw 70 will be rotated to cause the aforesaid braking operation of the low speed controlling device 32 to cause the low speed drive to take place through the transmission. It will furthermore be noted that with the low speed rack 85 in the position illustrated, the remaining racks 86, 87 as well as projection 88 are free from engagement with their respective associated gears 77ᵃ, 77ᵇ and the lever 55. From Figs. 6 and 12 it will be noted that the shaft D has a space longitudinally and circumferentially between the second speed rack 87 and the direct projection 88, this space being designated as the neutral space "N" so that when the shaft is positioned with this space facing the screw gears, each of the racks as well as projection 88 will be free from contact with their associated screw gears and lever 55 and the transmission will be in neutral at which time the various braking devices 32, 33, 34 and 35 are released.

Figures 9, 10, 11, 12:
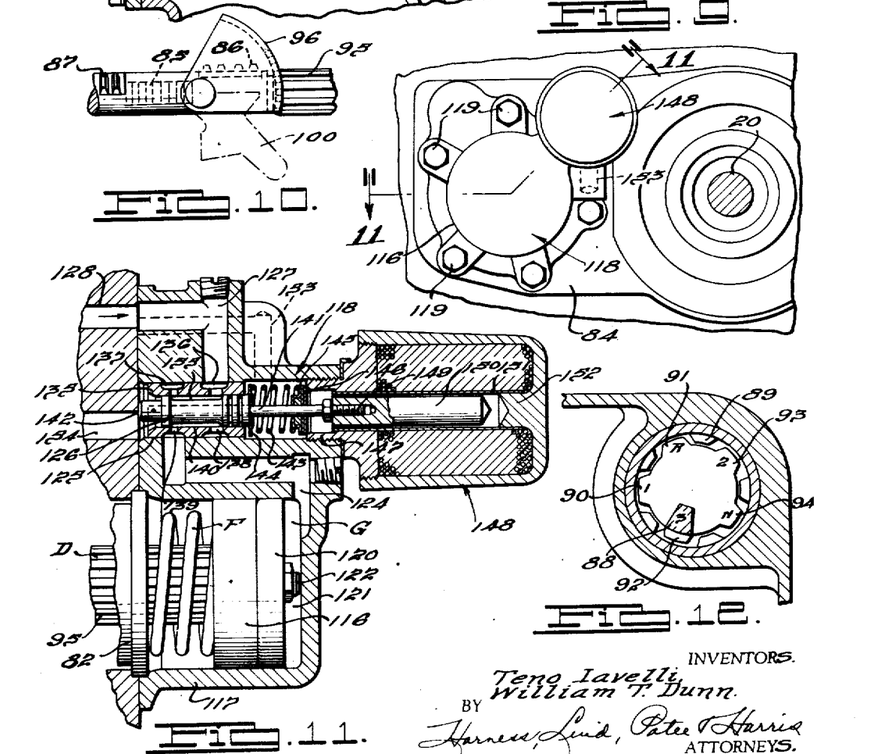
Fig. 9 is a rear elevational view illustrating the housing mechanism for the fluid pressure operator and associated control valve, the view being taken as indicated by line 9—9 of Fig. 6.
Fig. 10 is a detail sectional elevational view taken along the line 10—10 of Fig. 6.
Fig. 11 is an enlarged sectional view taken as indicated by the line 11—11 of Fig. 9.
Fig. 12 is a detail sectional elevational view taken along the line 12—12 of Fig. 6.
Figures 13, 14:
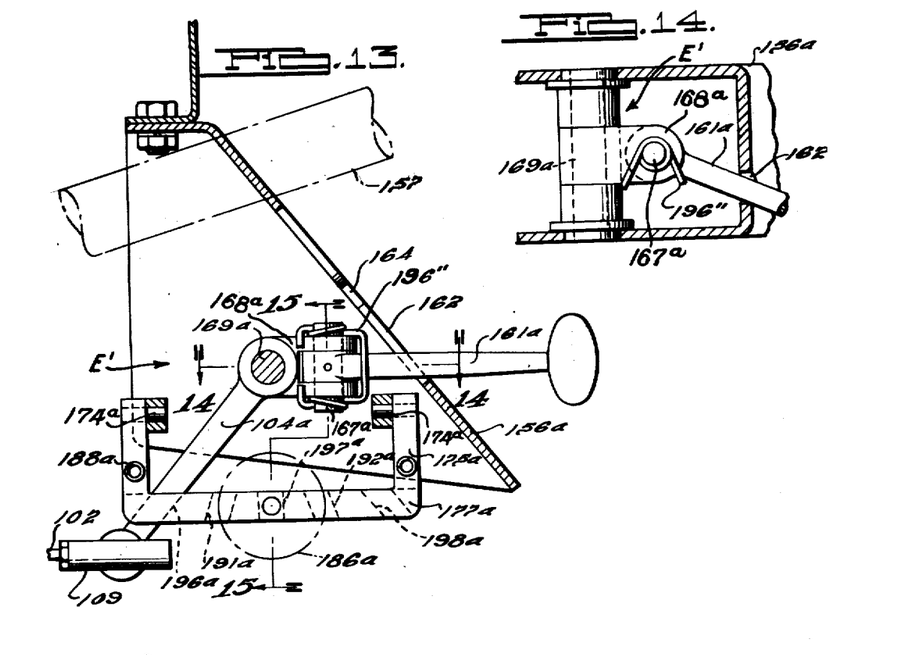
Fig. 13 is a sectional elevational view corresponding to Fig. 3 but illustrating a modified arrangement of selector element.
Fig. 14 is a sectional view taken as indicated by line 14—14 of Fig. 13.
Figure 15:
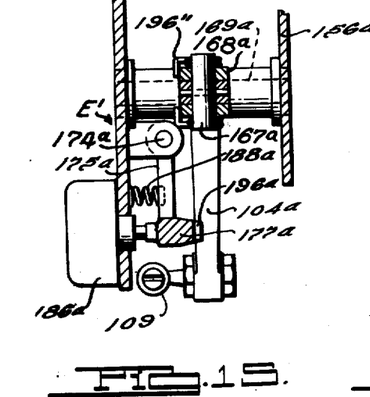
Fig. 15 is a sectional view taken as indicated by line 15—15 of Fig. 13.
Figure 16:
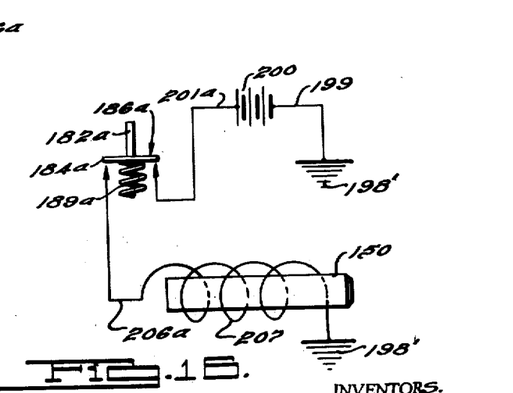
Fig. 16 is a wiring diagram for the Fig. 13 arrangement.

In order to insure proper selective rotation of the shaft D prior to reciprocating action thereof, bushing 94 has a series of internal lugs 89 spaced to receive projections 90 to 94, inclusive, these projections being respectively longitudinally aligned with racks 85, 86, projection 88, rack 87 and the neutral space. In Fig. 12 these projections also bear legends 1, R, 3, 2 and N respectively corresponding to the functions of control of the aligned racks, projection and space aforesaid. Only when the shaft D is properly adjusted to align the projections with the spaces between lugs 89 can the shaft D be reciprocated for its power stroke.

In order to selectively rotate the rack D for selectively engaging the racks and projection 88 thereof with the respective screw gears and lever 55, and also for axially operating the shaft in the various positions of selective adjustment, the following mechanism is provided.

Rearwardly adjacent the reverse rack 86, the shaft D is provided with a circular rack or gear 95 meshing with the segmental rack 96 rotatably fixed with a shaft 97 best shown in Fig. 8, this shaft being rotatably journalled by a bearing 98 carried by the transmission side cover 99. The shaft 97 has fixed thereto, outwardly of the transmission cover, a lever 100 connected at 101 (see Fig. 1) to a Bowden wire operating mechanism 102 which extends forwardly for pivotal connection with the ball end 103 of a lever 104.

Figures 3, 4:
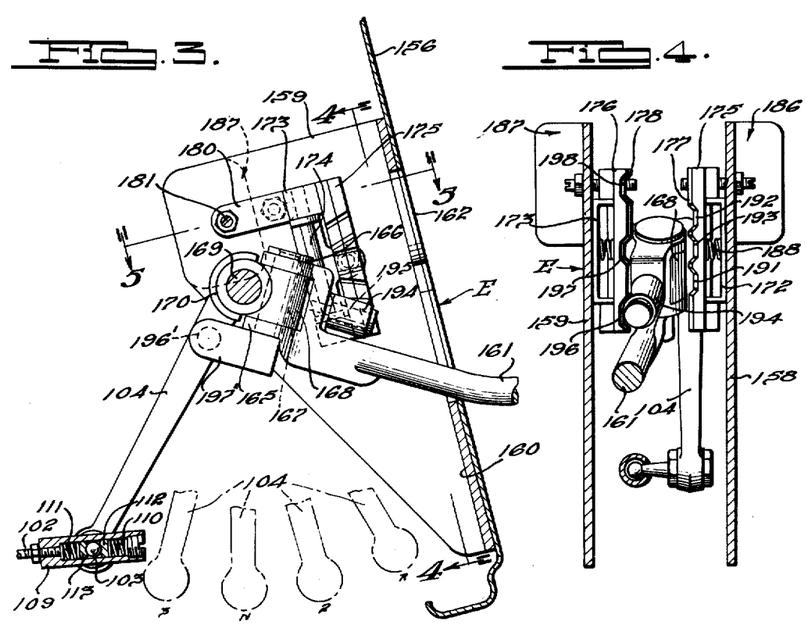
Fig. 3 is a sectional view of the manually controlled selecting mechanism taken along the line 3—3 of Fig. 2.
Fig. 4 is a sectional view along the line 4—4 of Fig. 3.
Figure 5:
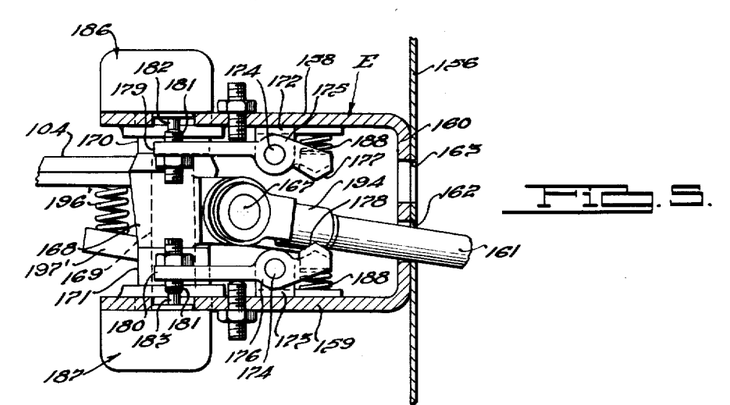
Fig. 5 is an enlarged sectional plan view taken as indicated by the line 5—5 of Fig. 3.

The Bowden wire mechanism 102 has a guide bracket 106 rigidly secured to the transmission housing and the forward end portion is also slidably guided at 107 through the vehicle toe board structure 108, as best shown in Fig. 1. A yielding connection is preferably provided at some convenient point between the manual selector element, which will be shortly described, and the sector 106 for rotatably adjusting the shaft D. We have illustrated this yielding connection in Fig. 3 intermediate the lever ball end 103 and the forward end of the Bowden wire mechanism 102. The wire 102 is anchored at its forward end to the housing 109 provided with the preloaded oppositely acting springs 110 and 111 which respectively act against the ball seats 112 and 113. The springs 110 and 111 have sufficient rigidity so that normally they provide a rigid connection between lever 104 and Bowden wire 102. However, if for any reason the manually operated adjusting mechanism for the shaft D should bind at any point, the mechanism will be protected during any manual adjustment of lever 104 under such conditions by reason of the ability of springs 110 and 111 to yield. The yielding connection also permits movement of the manual control mechanism sufficiently to unload the rack D during speed ratio selecting operations as will presently be more apparent. This yielding connection is therefore in the nature of a safety device for the manually controlled selector operating mechanism and also functions during speed selections.

The lever 104 is a part of the manually controlled device generally designated at E for selectively controlling or manipulating the transmission speed ratios as will be presently more apparent.

Returning now to Fig. 6, the selector rack shaft D has its rear end adjacent the circular rack 95 provided with a groove 114 adapted to receive the flange 115 of the fluid pressure operating piston assembly 116 which reciprocates in the cylinder 117 which is a part of a casting 118 best illustrated in Figs. 9 and 11 as attached at 119 to the rear wall 84 of the transmission. The piston 116 provides the actuating member of the power operating means or pressure fluid operated motor G for moving shaft D under power to engage the various brake bands and the direct speed clutch 34.

For yieldingly urging the rack shaft D to the right or rearwardly to release the speed ratio controlling devices, we have provided prime mover means F preferably in the form of a compression coil spring surrounding the rear end portion of shaft D between the fixed abutment provided for the bearing member 82 and acting on piston 116. In Fig. 6 it will be noted that the bearing member 82 is conveniently held in position by clamping the same between the rear casing wall 84 of the transmission and the casting assembly 118.

The piston 116 has the flexible sealing cup 120 adapted to seal the piston against escape of the fluid forwardly of the cylinder 117, the cup 120 bearing against the walls of the cylinder under the action of the fluid pressure introduced to the pressure chamber 121. The sealing cup is held in place by the rearwardly extending threaded reduced end 122 of shaft D together with the fastener or nut 123. Fluid, such as oil under pressure, is introduced to the pressure chamber 121 as best shown in Fig. 11, through a passage 124 leading to the valve controlled chamber or cylinder 125 which slidably receives the fluid pressure supply controlling valve 126.

The cylinder 125 is supplied with oil under pressure through a passage 127 which receives the oil by a conduit 128 formed in the transmission casing casting. The conduit 128, as best shown in Fig. 1, leads to the delivery side of a suitable pump 129 driven from its location in the oil storing sump or reservoir 130 of the transmission casing by reason of the shaft 131 provided at its forward end by a driving gear 132. This gear meshes with an idler gear 133 which in turn meshes with the driving pinion 134 (see Fig. 6) carried on the rear end of the driving sleeve 29 which, as aforesaid, is fixed to the fluid impeller 21.

A valve guide porting member 135 is pressed into the cylinder 125 so as to be fixed therewith, this porting member having annular conduits 136 and 137, respectively, communicating with the passages 127 and 124. The annular passages 136 and 137 are also respectively provided with the inwardly extending ports 138 and 139 adapted for control by the valve 126. This valve has a sliding fit within the cylindrical bore 140 of the porting member 135 and extending axially through the valve with sufficient clearance to prevent binding thereof, is a valve operating rod 141, preferably of brass or other non-magnetic material. The rod 141 extends forwardly of valve 126 and is provided with a stop 142 adapted to limit forward movement of valve 126 under the influence of a spring 143 which operates between the valve spring abutment 144 and a rear fixed abutment 145, the latter having associated therewith the fluid pressure sealing washers 146 acting against the threaded stem 147 of the electrical solenoid 148.

The rear end of valve operating rod 141 is connected at 149 with the armature 150 of solenoid 148, the armature being adapted for reciprocation in the solenoid cylinder 151 having the rear abutment 152. Any fluid which may leak rearwardly beyond the valve 126 is adapted to drain downwardly from the portion of casting 118 which encloses the valve operating spring 143 by reason of the drain conduit 153, this conduit then extending forwardly to the main body of the transmission where the oil is permitted to drain back to the reservoir 130. A further conduit 154 is adapted to return the oil from operating cylinder 121 back to the reservoir, this conduit 154 opening rearwardly to the forward end of valve 126.

The valve 126 has the reduced valving portion 155 adapted to place the conduits 127 and 124 in communication when the valve is in its forward position under the influence of spring 143. In the drawings, the parts are shown in their positions for operating the low speed controlling device 32, the valve 126 being positioned forwardly so that the fluid pressure is just being delivered from the supply conduit 127 to the conduit 124 and the pressure chamber 121 of the cylinder 117. When the valve 126 moves rearwardly under the influence of solenoid 148, as will be presently more apparent, the spring 143 will be compressed and the reduced portion 155 of the valve will no longer provide communication between conduits 127 and 124. At such time the conduit 124 will be open through the port 139 to the discharge conduit 154 for returning the oil from the pressure chamber 121 back to the reservoir 130. When the valve 126 moves forwardly under the influence of spring 143, the reduced valve portion 155 affords communication between conduits 127 and 124 to supply fluid pressure from the pump 129 to operate the piston 116 and selector rack shaft D forwardly for actuating one of the speed ratio controlling devices 32, 33, 34 or 35, depending on the rotative selective adjustment of the selector rack shaft, as will be presently more apparent.

The function and operation of the manually controlled selector mechanism E in relation to the selector rack shaft D will now be further described.

The mechanism E is located at some convenient point for manipulation by the vehicle driver while driving the vehicle. We have illustrated this mechanism as mounted on the rear face of the instrument panel 156 forwardly of the right hand portion of the usual steering wheel 157. The mechanism comprises a support casing having the side walls 158, 159 and the rear wall 160 which is secured to panel 156.

The panel 156 provides an H-plate for the manually operable selector element or change speed operating lever 161, this H-plate comprising the elongated slot 162, the relatively shorter slot 163 parallel thereto, and the communicating crossover neutral gate 164. The ends of the slots provide stations of selective control of the transmission by lever 161, these being indicated as 1, 2, 3 and R; the neutral position being designated as N. The mechanism is so arranged that longitudinal movements of the lever 161 control rotation of shaft D and hence the selective operative connection of this shaft with the various transmission control devices 32 to 35, or neutral. Thus, as lever 161 moves from the illustrated position at first or low speed, the lower end of lever 104 (see Fig. 3) is swung through the positions shown in dotted line and correspondingly designated 3, N, 2 and R. It is for this reason that slot 162 is made longer than slot 163 so that all of the control stations are included in the limits of the longitudinal travel of lever 161. Of course, to select stations 2 or 3, the lever must be moved through N and into slot 163 and we have also provided controls for solenoid 148 so that in going from N to R or 1, the transmission will not be operated for stations 2 and 3 although these are intermediate the longitudinal swinging limits of lever 161.

The wall 160 is slotted to correspond to the H-plate slotting of panel 156, the inner end of lever 161 having an offset yoke with arms 165, 166 mounted on a pivot pin 167 carried by the upper swivel joint-forming end 168 of lever 104. The end portion 168 carries a second pivot pin 169 at right angles with pin 167, the pin 169 having its ends rotatably supported in walls 158, 159. End bushings 170, 171 maintain lever portion 168 against sliding along the pin 169.

As thus far described, it will be apparent that pin 167 permits lever 161 to move laterally at gate 164 without moving lever 104, but that all longitudinal movements of lever 161 will operate lever 104 as a unit therewith about the axis of pin 169.

The walls 158, 159 respectively carry brackets 172, 173 each mounting a pivot pin 174 on which are respectively swingingly mounted the switch controlling members 175, 176. These switch control members are respectively provided with the cammed or notched faces 177, 178 at their rear ends, and the switch operating arms 179, 180 at their forward ends. These arms each mount an adjustable pin 181 and they engage the insulated stems 182, 183 of switch elements 184, 185 (see Fig. 7) of the switches generally indicated at 186, 187. Each of the members 175, 176 is yieldingly swingingly urged by a relatively heavy spring 188 which rocks ends 179, 180 to normally maintain switch elements 184, 185 open against the relatively light springs 189, 190 which respectively close switch elements 184, 185 when springs 188 are compressed by the lever 161 as will presently be apparent.

The member 175 is the second and third speed control member and its face 177 has notches 191, 192 respectively corresponding to these settings of lever 161, and a neutral notch 193. These notches are selectively engaged by a roller 194 rotatably carried by a pin 195 supported by lever 161, it being noted that the notches are formed radially about the longitudinal axis of swing of lever 161 at pin 169. When lever 161 is in the positions 2, N or 3 of slot 163, roller 194 will respectively engage notches 191, 193 or 192, spring 188 at such times swinging member 175 to maintain switch element 185 open against the action of spring 190. When lever 161 is moved from one of these notches to the other, roller 194 at the start of such movement will cause member 175 to rock about its pin 174 against the action of spring 188 to permit spring 190 to close switch element 185.

In similar manner the face 178 is notched at 196, 197 and 198 respectively engageable with roller 194 when lever 161 is positioned at the H-plate stations I, N and R. Member 176 is moved during shifting of lever 161 to permit switch 185 to close just as in the case of member 175. Lever 161 is preferably yieldingly urged laterally to its slot 163 by a spring 196' which acts on lever finger 197', the spring also abutting lever 104. Obviously only one of the members 175, 176 can be engaged at any time by lever roller 194 and with lever 161 in neutral or in any other stations of control, both switch elements 184, 185 are open so that no current is being consumed.

The wiring diagram is shown in Fig. 7 wherein the circuit may be considered to start from ground 198' along wire 199 to storage battery 200, thence through wire 201 to the switch points 202, 203 respectively for switch elements 184, 185 which are arranged in parallel. The circuit passes through either switch element to switch points 204, 205, thence through wire 206 to the windings 207 of solenoid armature 150 aforesaid, and is grounded at 198'.

Our manually controlled selector operating mechanism is practically instantaneous in its response to selective adjustment of the lever 161 and the different selections may be made as rapidly as desired. In the general operation of the selector mechanism E for changing the transmission speed ratio, the operator moves the selector lever 161 from one of the stations at the switch H-plate. Just as soon as the selector lever is so moved, one of the switch elements 184, 185 associated with such stations will be closed thereby inducing an electrical circuit through the solenoid windings 207 for causing the solenoid armature 150 to move rearwardly. This rearward movement of the solenoid armature will adjust the valve 126 rearwardly to place the fluid pressure chamber 121 of cylinder 117 in communication with the reservoir discharge conduit 154 whereupon the spring F will move the shaft D rearwardly to release any of the controlling devices 32 to 35 which may have been in operation. This entire phase of the operation takes place very quickly during the initial part of adjustment of the selector lever from any of its stations including the neutral stations N.

It should be noted at this point that the initial part of the adjustment of lever 161, as aforesaid, is permitted to take place by the yielding connection between lever 104 and Bowden wire 102. Thus, even though shaft D is in a position of actuation for one of the controlling devices, the lever 161 may be initially moved relative to shaft D sufficiently to cause actuation of the solenoid 148 to immediately move shaft D rearwardly to release any controlling device, further movement of lever 161 rotating shaft D to any desired selective new position.

When the selector lever is moved to a new station it will be apparent that one of the switch elements 184, 185 corresponding to such newly selected position will be opened (the other switch element remaining open) thereby interrupting the electrical circuit through the solenoid windings 207. At such time the spring 143 will immediately act to move the valve 126 and armature 150 forwardly to establish communication between the fluid pressure supply conduit 127 and the pressure chamber 124. This will immediately cause a forward movement induced by the fluid pressure on the shaft D for operating one of the selector controlling devices which may have been selected for the new position or else for operating shaft D without causing any movement of any of the speed ratio controlling devices in the event that neutral was selected.

Returning now to the aforesaid cycle of operation and to the point where the selector lever 161 was described as having been moved from one of the stations preparatory to movement thereof into a newly selected station, just as soon as the solenoid armature 150 moves rearwardly to operate valve 126 to vent the pressure chamber 121, it will be apparent that the fluid pressure load is removed from the shaft D which is now in its rearward position so that longitudinal movement of lever 161 will cause arcuate movement of the ball end 103 of the lever 104 and will operate through the Bowden wire mechanism 102 and sector 96 to rotatably adjust the shaft D into a new position for actuation of one of the speed ratio controlling devices. The mechanism operates almost instantaneously so that there is little resistance to adjustment of selector lever 161 from a position at any station and any binding tendency experienced at the shaft D will be taken up yieldingly through the Bowden wire connection at 109.

One feature of our invention resides in the simplified motor vehicle control which is possible by our novel transmission system, the selector lever 161 being positioned for manipulation laterally to the right of the steering wheel 157 and just therebelow so that the right hand of the operator on the steering wheel may be quickly and conveniently moved to the lever 161 for effecting a change in the condition of the transmission.

Referring now to the modified embodiment of our invention as shown in Figs. 13 to 16, the control mechanism E' is adapted for substitution for mechanism E in the previous embodiment. The same Bowden wire 102 is yieldingly connected as aforesaid to lever 104ª pivotally supported by pin 169ª, this lever having the swivel portion 168ª carrying pin 167ª mounting selector lever 161ª for lateral swinging in the same H-plate provided by panel 156ª.

A single switch 186ª controls the solenoid for all stations, the switch stem 182ª having its switch element 184ª yieldingly urged by spring 189ª to open the switch and break the circuit through wires 201ª and 206ª. The wiring diagram is otherwise as in Fig. 7.

The single swinging switch control member 175ª is mounted at 174ª and is acted on by a spring 188ª urging member 175ª to allow spring 189ª to open the switch. Lever 104ª engages the face 177ª which has notches 196ª, 191ª, 197ª, 192ª and 198ª which function similarly to the corresponding aforesaid notches 196, 191, 197, 192 and 198 for positions of lever 161ª at low, third, neutral, second and reverse, this being the progression of swing of the lever 104ª in moving the connected end of Bowden wire 102 rearwardly. A spring 196'' yieldingly urges swinging movement of selector element 161ª toward the second and third speed slot of the H-plate.

With lever 161ª at any stations, member 175ª is swung by spring 188ª by reason of a corresponding notch in face 177ª, switch spring 189ª opening the switch. When lever 161ª is moved from any station, member 175ª first swings to close the switch to actuate the solenoid armature 150 so that the operation of the system in general is just as described in connection with the principal embodiment. Further detailed description of the operation of the modified arrangement is therefore not believed to be necessary.

Our principal embodiment is preferred since in shifting from neutral to reverse or first, the shaft D is not operated in the intermediate positions of second or third. However, in the modification, it will be apparent that such is not the case since member 175ª will be operated for all progressions of movements of lever 161ª in operating lever 104ª across the notched face 177ª of member 175ª. By reason of the rapid selections possible, and the use of the fluid coupling B, this is not very objectionable although the arrangement of the main embodiment is ordinarily preferred.

While we have described our manual selector element as shiftable in an H-shaped path to the various stations of transmission control, we desire to point out that this reference to the path shape is used generally, it being obvious that the number of stations and their relative positions may cause some variance in the particular shape of the path movement. Omitting the second speed drive, for example, would obviously result in omitting the second speed "arm" or "leg" of the H-slot.

Various modifications and changes will be apparent from the teachings of our invention, as defined in the appended claims, and it is not our intention to limit our invention to the particular details of construction and mode of operation shown and described for illustrative purposes.

We claim:

1. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manual'y shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling operation of one of said operating means, electrical switch means for controlling energization of said electrically controlled means, means for operating said switch means including a movable switch operating element, and means for supporting said switch operating element for movement thereof relative to said selector element and relative to said switch means in response to shifting movement of said selector element.

2. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively correspinding to said plurality of forward driving speeds and reverse for controlling the operation of said power operating means and said selector operating means, means for mounting said selector element for shifting movements in a substantially H-shaped path, electrically controlled means for controlling operation of said power operating means, electrical switch means for controlling energization of said electrically controlled means, means for operating said switch means including a movable switch operating element, and means for supporting said switch operating element for movement thereof relative to said selector element and relative to said switch means in response to shifting movement of said selector element.

3. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, valving means controlling communication between a source of fluid under pressure and said fluid power operating means, solenoid means for operating said valving means, electrical switch means for controlling energization of said solenoid, means for operating said switch means including a movable switch operating element, and means for supporting said switch operating element for movement thereof relative to said selector element and relative to said switch means in response to shifting movement of said selector element.

4. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, valving means controlling communication between a source of fluid under pressure and said fluid power operating means, solenoid means for operating said valving means, electrical switch means for controlling energization of said solenoid, means for operating said switch means including a movable switch operating element, means for supporting said switch operating element for movement thereof relative to said selector element and relative to said switch means in response to shifting movement of said selector element, and means operably connecting said selector operating means with said selector element.

5. In a motor vehicle transmission of the planeary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, said power operating means including a common selector operating member adapted for selective operative connection with said plurality of element engaging means, a selector element manually shiftable to a plurality of stations of transmission control respectively corresponding to said plurality of forward driving speeds and reverse for controlling the operation of said power operating means, means for controlling adjustment of said common operating member in response to shifting of said selector element, means for mounting said selector element for shifting movements in a substantially H-shaped path, electrically controlled means for controlling operation of said power operating means, electrical switch means for controlling energization of said electrically controlled means, means for operating said switch means including a movable switch operating element, and means for supporting said switch operating element for movement thereof relative to said selector element and relative to said switch means in response to shifting movement of said selector element.

6. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means including a common selector operating member adapted for selective operative connection with said plurality of element engaging means, valving means controlling communication between a source of fluid under pressure and said fluid power operating means, a selector element manually shiftable to a plurality of stations of transmission control respectively corresponding to said plurality of forward driving speeds and reverse for controlling the operation of said power operating means, means for controlling adjustment of said common operating member in response to shifting of said selector element, means for mounting said selector element for shifting movements in a substantially H-shaped path, solenoid means for operating said valving means, electrical switch means for controlling energization of said solenoid, means for operating said switch means including a movable switch operating element, and means for supporting said switch operating element for movement thereof relative to said selector element and relative to said switch means in response to shifting movement of said selector element.

7. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, said power operating means including a common selector operating member adapted for selective operative connection with said plurality of element engaging means, a selector element manually shiftable to a plurality of stations of transmission control respectively corresponding to said plurality of forward driving speeds and reverse, means for controlling adjustment of said common operating member in response to shifting of said selector element, means for mounting said selector element for shifting movements in a substantially H-shaped path, electrically controlled means for controlling operation of said power operating means, electrical switch means for controlling energization of said electrically controlled means, means for operating said switch means including a movable switch operating element, and means for supporting said switch operating element for movement thereof relative to said selector element and relative to said switch means in response to shifting movement of said selector element.

8. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling operation of one of said operating means, electrical switch means for controlling energization of said electrically controlled means, means for operating said switch means including a movable switch operating element, and means for pivotally supporting said switch operating element 'or swinging movement relative to said selector element and relative to said switch means in response to shifting movement of said selector element.

9. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in transversely connecting paths of corresponding direction, electrically controlled means for controlling operation of one of said operating means, electrical switch means for controlling energization of said electrically controlled means, means for operating said switch means including a movable switch operating element, and means for supporting said switch operating element for movement thereof relative to said selector element and relative to said switch means in response to shifting movement of said selector element.

10. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in transversely connecting paths of corresponding direction, electrically controlled means for controlling operation of said power operating means, electrical switch means for controlling energization of said electrically controlled means, means for operating said switch means including a movable switch operating element, and means for supporting said switch operating element for movement thereof relative to said selector element and relative to said switch means in response to shifting movement of said selector element.

11. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling operation of one of said operating means, a plurality of electrical switches each adapted to control energization of said electrically controlled means independently of the other, means for operating said switches including a plurality of movable switch operating elements, and means for supporting said switch operating elements for movement thereof with respect to one another and with respect to said switches in response to shifting movement of said selector element.

12. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling operation of said power operating means, a plurality of electrical switches each adapted to control energization of said electrically controlled means independently of the other, means for operating said switches including a plurality of movable switch operating elements, and means for supporting said switch operating elements for movement thereof with respect to one another and with respect to said switches in response to shifting movement of said selector element.

13. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, valving means controlling communication between a source of fluid under pressure and said fluid power operating means, solenoid means for operating said valving means, a plurality of electrical switches for controlling energization of said solenoid independently of each other, means for operating said switches including a plurality of movable switch operating elements, and means for supporting said switch operating elements for movement thereof with respect to one another and with respect to said switches in response to shifting movement of said selector element.

14. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, valving means controlling communication between a source of fluid under pressure and said fluid power operating means, solenoid means for operating said valving means, a plurality of electrical switches for controlling energization of said solenoid independently of each other, means for operating said switches including a plurality of movable switch operating elements, means for supporting said switch operating elements for movement thereof with respect to one another and in response to shifting movement of said selector element, and with respect to said switches, means operably connecting said selector operating means with said selector element.

15. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, said power operating means including a common selector operating member adapted for selective operative connection with said plurality of element engaging means, a selector element manually shiftable to a plurality of stations of transmission control respectively corresponding to said plurality of forward driving speeds and reverse for controlling the operation of said power operating means, means for controlling adjustment of said common operating member in response to shifting of said selector element, means for mounting said selector element for shifting movements in a substantially H-shaped path, electrically controlled means for controlling the operation of said power operating means, a plurality of electrical switches each adapted to control energization of said electrically controlled means independently of the other, means for operating said switches including a plurality of movable switch operating elements, and means for supporting said switch operating elements for movement thereof with respect to one another and with respect to said switches in response to shifting movement of said selector element.

16. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, fluid power operating means including a common selector operating member adapted for selective operative connection with said plurality of element engaging means, valving means controlling communication between a source of fluid under pressure and said fluid power operating means, a selector element manually shiftable to a plurality of stations of transmission control respectively corresponding to said plurality of forward driving speeds and reverse for controlling the operation of said power operating means, means for controlling adjustment of said common operating member in response to shifting of said selector element, means for mounting said selector element for shifting movements in a substantially H-shaped path, a plurality of electrical switches for controlling energization of said solenoid independently of each other, means for operating said switches including a plurality of movable switch operating elements, and means for supporting said switch operating elements for movement thereof with respect to one another and with respect to said switches in response to shifting movement of said selector element.

17. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, said power operating means including a common selector operating member adapted for selective operative connection with said plurality of element engaging means, a selector element manually shiftable to a plurality of stations of transmission control respectively corresponding to said plurality of forward driving speeds and reverse, means for controlling adjustment of said common operating member in response to shifting of said selector element, means for mounting said selector element for shifting movements in a substantially H-shaped path, electrically controlled means for controlling operating of said power operating means, a plurality of electrical switches each adapted to control energization of said electrically controlled means independently of the other, means for operating said switches including a plurality of movable switch operating elements, and means for supporting said switch operating elements for movement thereof with respect to one another and with respect to said switches in response to shifting movement of said selector element.

18. In a power transmission, a plurality of speed ratio controlling devices, means including a power operator for selectively operating said devices, a selector element adapted for shifting movement in transversely connecting paths of corresponding directions to a plurality of stations of transmission control, electrical switch controlled means for controlling operation of said power operator in response to shifting movement of said selector element, means for operating said switch means including a movable switch operating element, and means for supporting said switch operating element for movement thereof relative to said selector element and relative to said switch means in response to shifting movement of said selector element.

19. In a power transmission, a plurality of speed ratio controlling devices, means including a power operator for selectively operating said devices, a selector element adapted for shifting movement in transversely connecting paths of corresponding directions to a plurality of stations of transmission control, electrical switch controlled means for controlling operation of said power operator in response to shifting movement of said selector element, means for operating said switch means including a movable switch operating element, means for supporting said switch operating element for movement thereof relative to said selector element and relative to said switch means in response to shifting movement of said selector element, means selectively operably connecting said power operator with said controlling devices, and means operably connecting said selector element with said selectively operable connecting means.

20. In a power transmission, a plurality of speed ratio controlling devices, means including a power operator for selectively operating said devices, means including a solenoid for controlling operation of said power operator means, an adjustable selector element adapted for movement in a substantially H-shaped path to a plurality of predetermined stations of transmission control, electric circuit means for energizing said solenoid, electrical switch means controlling said electric circuit means, means responsive to movement of said element between each of said stations for operating said switch means, said switch operating means comprising a movable switch operating element, and means for supporting said switch operating element for movement thereof relative to said selector element and relative to said switch means in response to shifting movement of said selector element.

21. In a power transmission, a plurality of speed ratio controlling devices, means including a power operator for selectively operating said devices, means including a solenoid for controlling operation of said power operator means, an adjustable selector element adapted for movement in a substantially H-shaped path to a plurality of predetermined stations of transmission control, electric circuit means for energizing said solenoid, electrical switch means controlling said electric circuit means, means responsive to movement of said element between each of said stations for operating said switch means, said switch operating means comprising a movable switch operating element, means for supporting said switch operating element for movement thereof relative to said selector element and relative to said switch means in response to shifting movement of said selector element, and means responsive to movement of said selector element between said stations for selectively operably connecting said power operating means with said controlling devices.

22. In a power transmission, a plurality of speed ratio controlling devices, means including a power operator for selectively operating said devices, a selector element adapted for shifting movement in transversely connecting paths of corresponding directions to a plurality of stations of transmission control, a plurality of electrical switch controlling means each adapted to control operation of said power operator, means for operating said plurality of switch means including a plurality of movable switch operating elements, and means for supporting said switch operating elements for movement thereof with respect to one another and with respect to said plurality of switch means in response to shifting movement of said selector element.

23. In a motor vehicle speed ratio changing transmission, a plurality of speed ratio controlling devices, power operating means for operating said devices, selector means for selectively operably connecting said power operating means with said devices, a manually shiftable selector element, means operably connecting said selector element with said selector means for manipulating the latter by said selector element, and means for mounting said selector element for shifting movements in a substantially H-shaped path to a plurality of stations of transmission control, said mounting means including a pivot for guiding swinging movement of said selector element along the sides of said H-shaped path, said selector element having substantially greater shifting movement along one side of said H-shaped path than along the other side thereof.

24. In a motor vehicle speed ratio changing transmission, a plurality of speed ratio controlling devices, power operating means for operating said devices, selector means for selectively operably connecting said power operating means with said devices, a manually shiftable selector element, means operably connecting said selector element with said selector means for manipulating the latter by said selector element, means for mounting said selector element for shifting movements in a substantially H-shaped path to a plurality of stations of transmission control, said mounting means including a pivot for guiding swinging movement of said selector element along the sides of said H-shaped path, and a plate having a substantially H-shaped slot for guiding shifting movements of said selector element, the sides of said H-shaped slot being of substantially different length.

25. In a motor vehicle speed ratio changing transmission, a plurality of speed ratio controlling devices, power operating means for operating said devices, selector means for selectively operably connecting said power operating means with said devices, a manually shiftable selector element, means operably connecting said selector element with said selector means for manipulating the latter by said selector element, and means for mounting said selector element for shifting movements in a substantially H-shaped path to a plurality of stations of transmission control, said selector element having substantially greater shifting movement along one side of said H-shaped path than along the other side thereof, said connecting means including an oscillatory operating member moved to and fro in response to shifting movements of said selector element between said stations, said operating member being selectively positioned in its opposite limits of movement in response to shifting movements of said selector element selectively to its limits of movement along said path side of greater shifting movement.

26. In a motor vehicle speed ratio changing transmission, a plurality of speed ratio controlling devices, power operating means for operating said devices, selector means for selectively operably connecting said power operating means with said devices, a manually shiftable selector element, means operably connecting said selector element with said selector means for manipulating the latter by said selector element, means for mounting said selector element for shifting movements in a substantially H-shaped path to a plurality of stations of transmission control, and a plate having a substantially H-shaped slot for guiding shifting movements of said selector element, the sides of said H-shaped slot being of substantially different length, said connecting means including an operating member mounted for oscillation in response to shifting movements of said selector element between said stations, said operating member being selectively swung to its opposite limits of oscillatory movement in response to shifting movements of said selector element selectively to its limits of movement along that side of the H-shaped slot of relatively greater length.

27. In a motor vehicle speed ratio changing transmission, a plurality of speed ratio controlling devices, power operating means for operating said devices, selector means for selectively operably connecting said power operating means with said devices, a selector element manually shiftable in a substantially H-shaped path for manipulating said selector means, a follower member, means operably connecting said follower member with said selector means, and means providing a pivotal connection between said selector element and said follower member so constructed and arranged as to move said follower to and fro in response to selective shifting movements of said selector element along the sides of said H-shaped path but to allow relative movement to take place between said selector element and said follower member in response to shifting movements of said selector element across the sides of said H-shaped path.

28. In a motor vehicle speed ratio changing transmission, a plurality of speed ratio controlling devices, power operating means for operating said devices, selector means for selectively operably connecting said power operating means with said devices, a selector element manually shiftable in a substantially H-shaped path for manipulating said selector means, a follower member, means operably connecting said follower member with said selector means, means providing a pivotal connection between said selector element and said follower member so constructed and arranged as to move said follower to and fro in response to selective shifting movements of said selector element along the sides of said H-shaped path but to allow relative movement to take place between said selector element and said follower member in response to shifting movements of said selector element across the sides of said H-shaped path, electrical switch means, electrically operating means for controlling said power operating means in response to actuation of said electrical switch means, and means for actuating said switch means in response to shifting movements of said selector element.

29. In a motor vehicle speed ratio changing transmission, a plurality of speed ratio controlling devices, power operating means for operating said devices, selector means for selectively operably connecting said power operating means with said devices, a selector element manually shiftable in a substantially H-shaped path for manipulating said selector means, a follower member, means operably connecting said follower member with said selector means, means providing a pivotal connection between said selector element and said follower member so constructed and arranged as to move said follower to and fro in response to selective shifting movements of said selector element along the sides of said H-shaped path but to allow relative movement to take place between said selector element and said follower member in response to shifting movements of said selector element across the sides of said H-shaped path, a pair of electrical switches, electrically operating means for controlling said power operating means in response to selective operation of said switches, a pair of switch operating elements respectively operably associated with said switches, and means for mounting said switch operating elements for selective operation in response to shifting movements of said selector element along the respective sides of said H-shaped path.

30. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling the operation of one of said operating means, electrical switch means for controlling energization of said electrically controlled means, means for operating said switch means including a movable switch operating element, and means for pivotally supporting said switch operating element for swinging movement relative to said selector element and in response to shifting movement of said selector element, said switch operating element having a plurality of notches formed therein for selective reception of said selector element.

31. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling operation of one of said operating means, electrical switch means for controlling energization of said electrically controlled means, means for operating said switch means including a movable switch operating element, means for supporting said switch operating element for movement thereof relative to said selector element and relative to said switches in response to shifting movement of said selector element, and means for yieldingly urging said selector element when positioned for neutral toward one side of said H-shaped path to move said switch operating element.

32. In a motor vehicle transmission of the planetary gear type having a plurality of planetary gear operated rotary controlling elements for respectively controlling the drive to the vehicle in a plurality of forward speeds and in reverse, a plurality of means respectively associated with said rotary elements and adapted for operative engagement therewith to control said forward and reverse drives, power operating means for selectively operating said plurality of element engaging means, selector operating means for selectively controlling the application of said power operating means to said plurality of element engaging means, a selector element manually shiftable to a plurality of stations of transmission control respectively corresponding to said plurality of forward driving speeds and reverse for controlling the operation of said power operating means and said selector operating means, means for mounting said selector element for shifting movements in a substantially H-shaped path, electrically controlled means for controlling operation of one of said operating means, a plurality of electrical switches each adapted to control energization of said electrically controlled means independently of the other, means for operating said switches including a plurality of movable switch operating elements, means for supporting said switch operating elements for movement thereof with respect to one another and with respect to said switches in response to shifting movement of said selector element, and means for yieldingly urging said selector element when positioned for neutral toward one side of said H-shaped path to move one of said switch operating elements.

33. In a power transmission, a plurality of speed ratio controlling devices, means for selectively operating said devices including a power operator, a selector element adapted for shifting movement in an approximately H-shaped path to a plurality of stations of transmission control, electrical switch-controlled means for controlling operation of said power operator in response to shifting movements of said selector element, a switch having a swinging operating member for controlling energization of said electrical means, and means for supporting said operating member for swinging movement relative to said selector element and in response to shifting movements of said selector element between said plurality of stations.

34. In a motor vehicle power transmission, a rotatable transmission drive controlling member, a device adapted to frictionally engage said rotatable drive controlling member, a pressure fluid operable motor adapted to operate said device in frictional engagement with said rotatable drive controlling member, means for supplying liquid fluid under pressure for delivery to said motor, valving means controlling the delivery of said pressure fluid to said motor for controlling engagement and release of said frictionally engageable device, a solenoid operably connected to said valving means and adapted when energized to operate said valving means to effect release of said frictionally engageable device, a selector element manually shiftable to a plurality of stations of transmission drive control, means for mounting said selector element for shifting movement in a substantially H-shaped path, additional transmission drive control means adapted for selective manipulation in response to shift of said selector element, a switch device for controlling energization of said solenoid, said switch device having a swinging operating member adapted for swinging movement in response to shift of said selector element between each of said drive control stations, and means operating in response to shift of said selector element between each of said drive control stations for imparting swinging movement to said operating member to close said switch device and to thereafter effect manipulation of said additional drive control means.

35. In a motor vehicle transmission; a driver operated selector element; means for mounting said selector element for shifting movements in an approximately H-shaped path between predetermined stations of transmission control; and means operating in response to shift of said selector element for manipulating the transmission to change the vehicle drive, said operating means including a liquid fluid-delivery control valve, a solenoid for operating said valve, an electrical circuit for said solenoid, switch means including a swinging operating member for controlling said circuit, and means for mounting said operating member for swinging movement in response to shift of said selector element for closing said circuit during shift movements of said selector element and for opening said circuit when said selector element is disposed at said stations.

WILLIAM T. DUNN.
TENO IAVELLI.

CERTIFICATE OF CORRECTION.

Patent No. 2,173,648. September 19, 1939.

WILLIAM T. DUNN, ET AL.

It is hereby certified that error appears in the printed specification of the above numbered patent requiring correction as follows: Page 13, first column, line 60, claim 31, for the word "switches" read switch means; and that the said Letters Patent should be read with this correction therein that the same may conform to the record of the case in the Patent Office.

Signed and sealed this 2nd day of April, A. D. 1940.

Henry Van Arsdale,
Acting Commissioner of Patents.

effect manipulation of said additional drive control means.

35. In a motor vehicle transmission; a driver operated selector element; means for mounting said selector element for shifting movements in an approximately H-shaped path between predetermined stations of transmission control; and means operating in response to shift of said selector element for manipulating the transmission to change the vehicle drive, said operating means including a liquid fluid-delivery control valve, a solenoid for operating said valve, an electrical circuit for said solenoid, switch means including a swinging operating member for controlling said circuit, and means for mounting said operating member for swinging movement in response to shift of said selector element for closing said circuit during shift movements of said selector element and for opening said circuit when said selector element is disposed at said stations.

WILLIAM T. DUNN.
TENO IAVELLI.

CERTIFICATE OF CORRECTION.

Patent No. 2,173,648.                                    September 19, 1939.

WILLIAM T. DUNN, ET AL.

It is hereby certified that error appears in the printed specification of the above numbered patent requiring correction as follows: Page 13, first column, line 60, claim 31, for the word "switches" read switch means; and that the said Letters Patent should be read with this correction therein that the same may conform to the record of the case in the Patent Office.

Signed and sealed this 2nd day of April, A. D. 1940.

Henry Van Arsdale,
Acting Commissioner of Patents.